Figure 1:
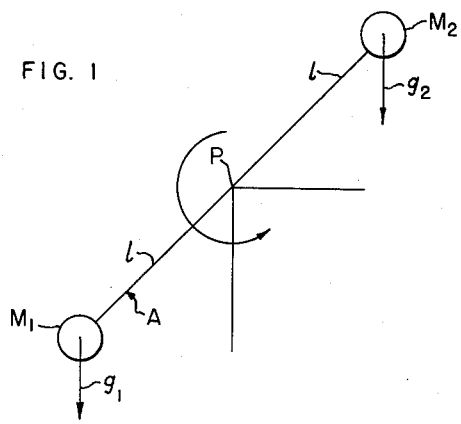

Dec. 17, 1963 R. R. WILLIAMSON 3,114,264
GRAVITY SENSING INSTRUMENT
Filed Sept. 19, 1960 5 Sheets-Sheet 1

GRAVITY VECTOR

INVENTOR
ROBERT R. WILLIAMSON
BY
ATTORNEY

Dec. 17, 1963 R. R. WILLIAMSON 3,114,264
GRAVITY SENSING INSTRUMENT
Filed Sept. 19, 1960 5 Sheets-Sheet 2
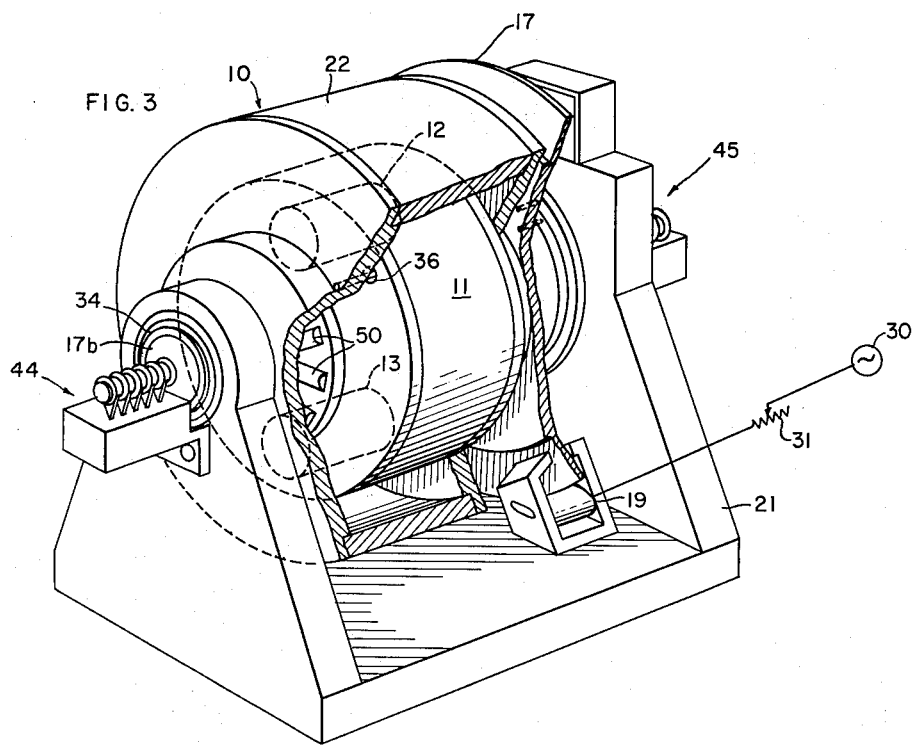
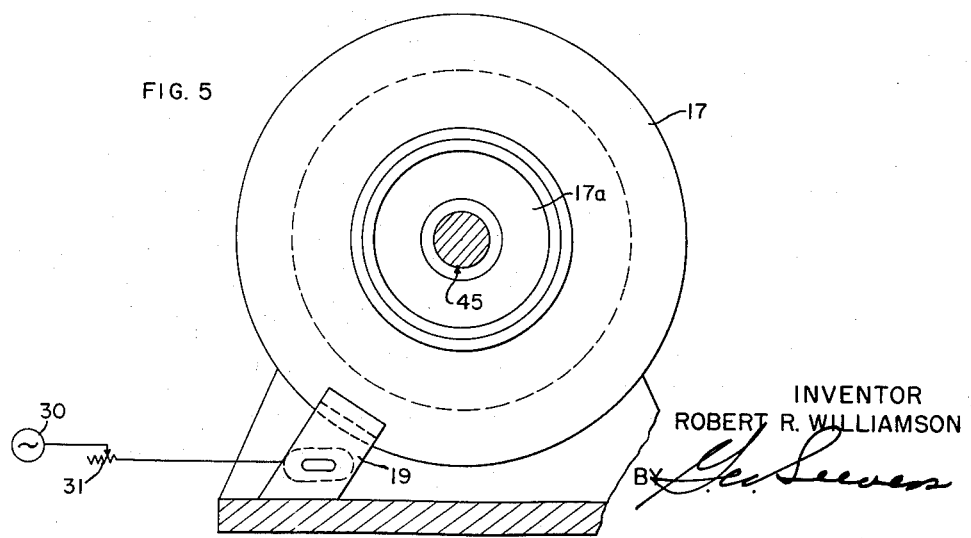
INVENTOR
ROBERT R. WILLIAMSON
BY
ATTORNEY

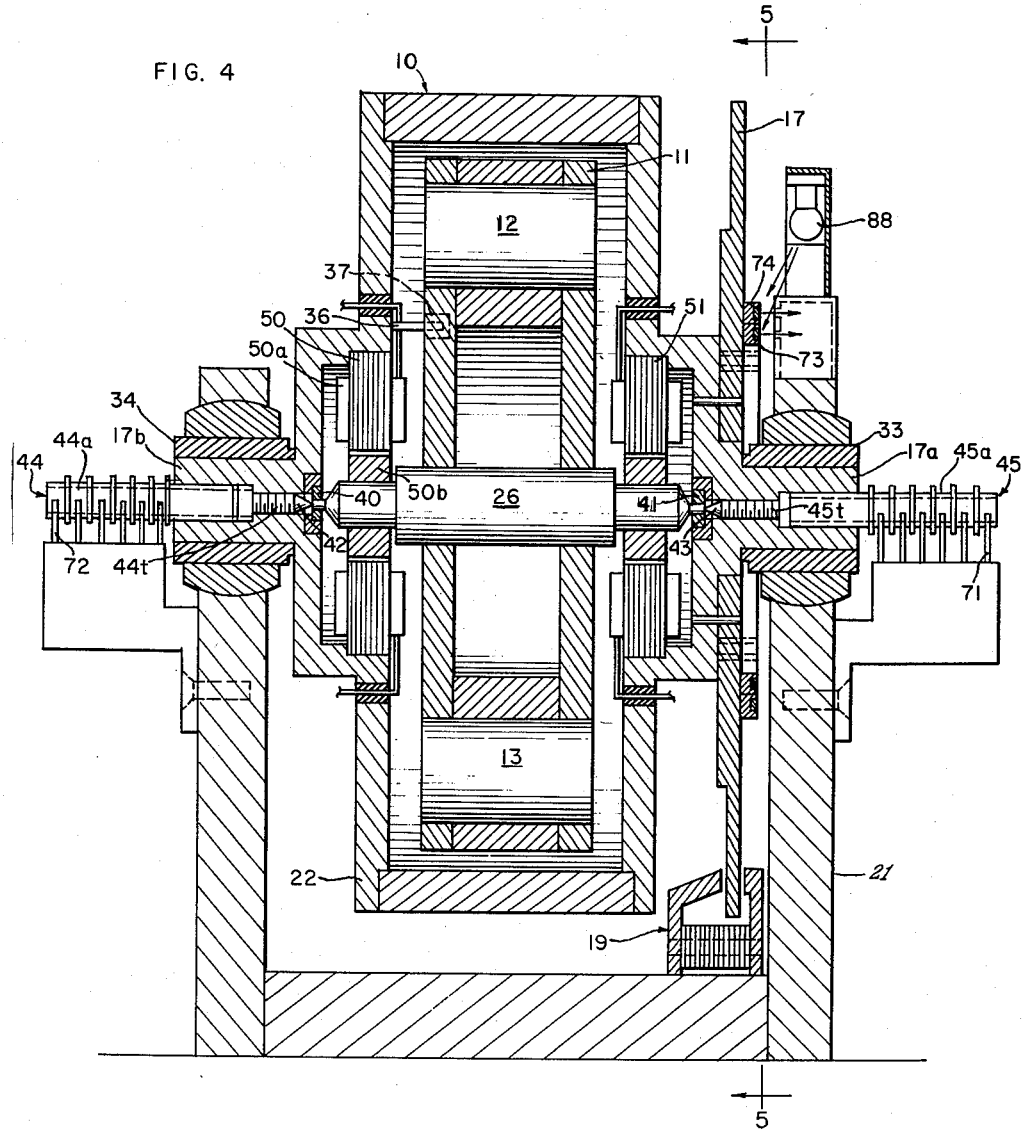

Dec. 17, 1963   R. R. WILLIAMSON   3,114,264
GRAVITY SENSING INSTRUMENT
Filed Sept. 19, 1960   5 Sheets-Sheet 4

INVENTOR
ROBERT R. WILLIAMSON
BY
ATTORNEY

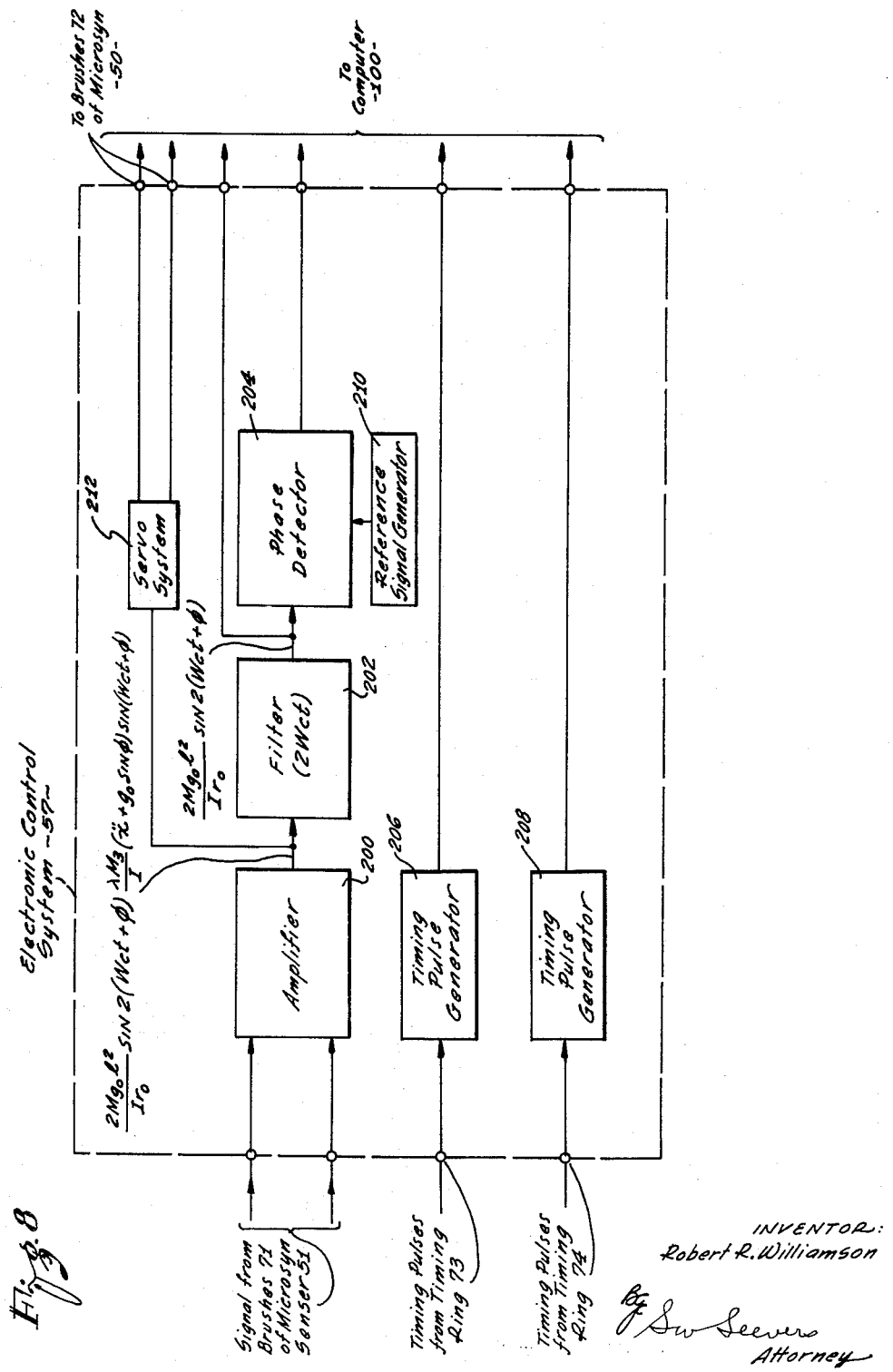

United States Patent Office 3,114,264
Patented Dec. 17, 1963

3,114,264
GRAVITY SENSING INSTRUMENT
Robert R. Williamson, Carlsbad, Calif., assignor to General Precision, Inc., a corporation of Delaware
Filed Sept. 19, 1960, Ser. No. 57,868
8 Claims. (Cl. 73—382)

The invention relates to instruments for use, for example, in inertial navigation; and it relates more particularly to a novel and improved instrument which functions to sense gravitational forces for navigational, or other purposes.

Heretofore, the usual inertial navigation system relied upon certain reference directions in space. The reference directions in the prior art systems are usually initially established by "erecting" a stable platform, and the reference directions are maintained or modified in such prior art systems by a gyroscopic control of the platform. These prior art systems have certain inherent defects in that the stable platform can be made self-erecting, only if its position and velocity in space are precisely known at all times during erection. Otherwise, external sensors are required. Also, gyroscopes, and the like, are imperfect instruments insofar as their ability to sense direction is concerned.

It is, therefore, an important object of the present invention to provide a unique and improved instrument which is capable of establishing directions in space without external assistance. The navigation system of the invention, unlike the prior art type of navigational system, in effect is not caused to "remember" initial reference directions in space by means of a stable platform assembly, and it is therefore not subject to the need for gyroscopic control, as mentioned, or for external sensors, as also mentioned.

Another object of the invention is to provide such an improved instrument which may be self-contained within a space vehicle, and which does not have to "look out" of the vehicle in order to establish directions in space. The latter objective is attained by the provision of an instrument which operates in response to a field phenomena pervading all space, and which field has a known relationship to the principal direction of interest for space navigation near a local celestial body, which requirements essentially eliminate all phenomena except gravity.

A still further object of the invention, therefore, is to provide a novel and improved reliable navigational instrument which is capable of accurately determining the direction of gravitational force of a local celestial body with respect to a vehicle in space. The instrument of the invention is most advantageous in that it does not require external sensors or initial settings. As noted, the instrument functions to sense the forces of gravity surrounding the local celestial body, and from such sensing the instrument is capable of detecting the direction of the center of the celestial body from the position in space of the particular vehicle carrying the instrument.

The problem to be solved by the instrument of the present invention is that of distinguishing between the gravitational field surrounding the particular body, and the field of force due to the acceleration of the vehicle itself. These two types of fields can be separated by measurements carried out at different points in space, and the present invention is constructed and conceived to achieve such measurements.

Consider, for example, a beam balance in a space vehicle. Such a balance usually includes a beam suspended at its mid-point and having pans at each end. For purposes of the present invention, it will be assumed that there are identical masses in the two pans. The beam itself can be accelerated only by a force acting at its pivot point, since this is the only point of constraint. Such a force should be an accelerating force due to accelerations of the vehicle. However, gravity acts on the two identical masses on the pans. Since the gravitational force exhibits field variations, it can be expected to have a dissimilar effect on the two masses; while the force due to translational acceleration of the vehicle does not have such a dissimilar effect.

The present invention is predicated on the concept that there is a definite relationship between the direction of gravity and the phase angle of the sinusoidal torque developed as the beam assembly rotates. This concept is used in a manner to be described to determine for navigational or other purposes, the direction of the gravitational force from a local celestial body with respect to a vehicle in space.

Features of the present invention reside in the provision of a continuously rotating sensor member which includes two spaced-apart equal masses. As the sensor member rotates, the gravitational forces on the two masses varies at twice the frequency of rotation. The instantaneous speed of rotation of the sensor varies in accordance with torques acting on it, and means are provided for sensing such torque variations so as to obtain an indication of the direction of the gravitational forces.

Figure 2:
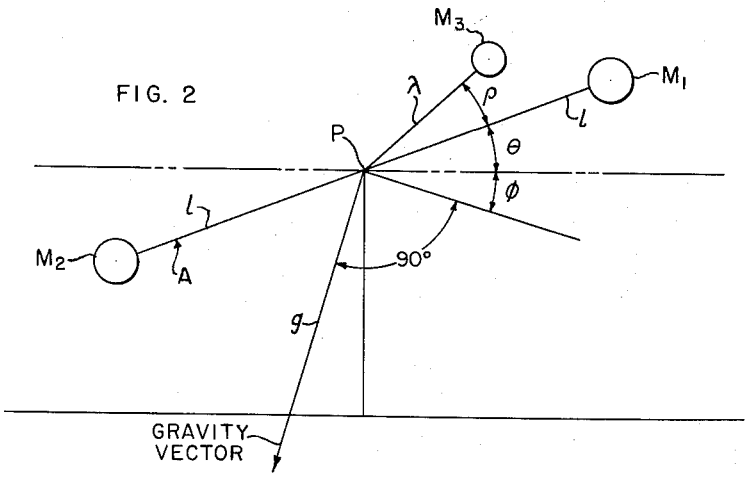
Figure 6:
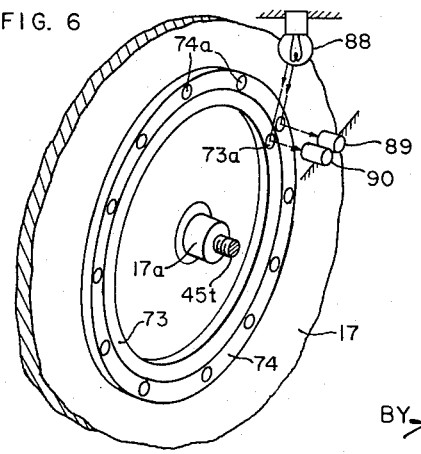
Figure 7:
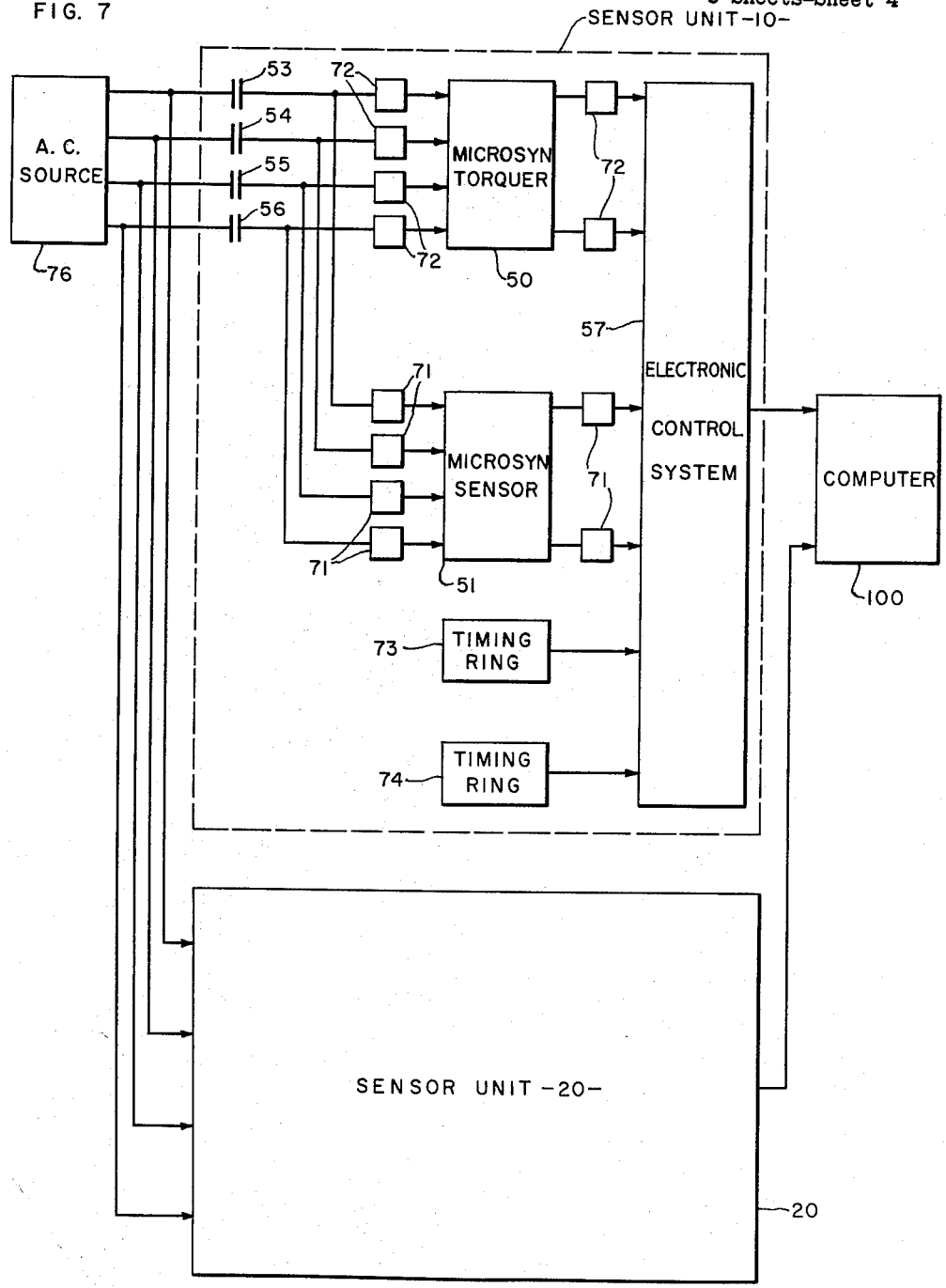

In the drawings:
FIGURE 1 is a schematic representation of a simplified version of the invention in which two identical masses are supported for rotation about a particular pivot point;
FIGURE 2 is a schematic representation useful in explaining the operating principles upon which the present invention is predicated;
FIGURE 3 is a pictorial representation of one particular instrument constructed to carry out the concepts of the present invention;
FIGURE 4 is a sectional view of a portion of the instrument of FIGURE 3;
FIGURE 5 is a sectional view of the instrument of FIGURE 1 taken substantially on the lines 5—5 of FIGURE 4;
FIGURE 6 is a partial pictorial view of a timing disk utilized in the instrument of FIGURE 4;
FIGURE 7 is a functional block diagram of a gravity sensing system embodying the concepts of the invention; and
FIGURE 8 is a functional block diagram of an electronic control system shown in FIGURE 7.

A simplified form of an instrument for determining the direction of the gravitational force from a local celestial body is shown in the schematic representation of FIGURE 1. The instrument illustrated in FIGURE 1 includes two equal masses $M_1$ and $M_2$ supported by an arm A having a length $2l$ and pivotally supported on a pivot P at its mid-point. For the ideal case, the masses $M_1$ and $M_2$ are identical in weight, the arm A is weightless, and the support of the pivot P is frictionless. The arm A is pivotally mounted at the pivot point P, as noted above, and the pivot point is equidistant from the centers of gravity of the identical masses $M_1$ and $M_2$. The arm A is constrained to rotate, for example, in the plane of the paper.

Since the force of gravity on a mass is inversely proportional to the square of its distance from the center of the local celestial body, the two masses $M_1$ and $M_2$ will experience different forces due to gravity when the pivot arm A is not horizontal with respect to the local celestial body. This force differential on the masses $M_1$ and $M_2$ will create an unbalanced torque which, in turn, will produce an angular acceleration of the pivot arm A about the pivot point P. The acceleration produced is approximately proportional to sine $2\theta$. Where $\theta$ is the angle the arm A makes with the normal to the gravity vector in the plane of rotation.

The angular acceleration of the system due to the gravitational forces will be zero when the arm A is normal to, or parallel with, the component of the gravity vector lying in the plane of the device, and this serves to indicate the direction of the gravitational force in that plane. In order to determine the direction of gravity, it will be necessary to have a system of two instruments of the type shown in FIGURE 1, mounted perpendicularly to one another. This will give gravity direction information in two perpendicular planes, from which the direction in three dimensional space can be determined.

The theory underlying the gravity sensing instrument of the invention can best be understood by reference to the diagram of FIGURE 2. In this diagram two identical masses $M_1$ and $M_2$ are assumed to be supported at the end of a weightless arm which is pivoted at its mid-point P, and which has a length $2l$. Due to the impossibility of suspending the masses $M_1$ and $M_2$ at the exact mass center, there will be a mass unbalance term, and it is represented by the mass $M_3$. The mass $M_3$ is assumed to be mounted at the end of an arm $\lambda$, which is also pivoted at the point P and which is disposed at a fixed angle $\rho$ to the arm A.

It is also assumed that $\theta$ is the instantaneous angle the arm A makes with an arbitrary reference line, and that the arbitrary reference line makes an angle $\phi$ with the normal to the gravity vector in the plane of the system. The value of the gravitational acceleration $g$ varies inversely with the square of the distance $r$ of a particular body from the gravitational source. Then if the gravitational acceleration at the pivot P is assumed to be $g=g_0$, and the point P is assumed to be a distance $r_0$ from the center of the local celestial body; different gravitational accelerations $g_1$, $g_2$ and $g_3$ will be experienced by the masses $M_1$, and $M_2$ and $M_3$ which are assumed to be respective distances $r_1$, $r_2$ and $r_3$ from the center of the local celestial body. The local celestial body will, therefore, exert force vectors $M_1 g_1$, $M_2 g_2$ and $M_3 g_3$ on the three masses $M_1$, $M_2$ and $M_3$ in the plane of the system $$g_1 = g_0 \frac{r_0^2}{r_1^2} = g_0 \left[ \frac{r_0}{r_0 + l \sin(\theta+\phi)} \right]^2$$

and correspondingly:

$$g_2 = g_0 \left[ \frac{r_0}{r_0 - l \sin(\theta+\phi)} \right]^2 \qquad (1)$$

$$g_3 = g_0 \left[ \frac{r_0}{r_0 + \lambda \sin(\theta+\phi+\rho)} \right]^2$$

The forces exerted on the masses are:

$$F_1 = M_1 g_1 = M_1 g_0 \left[ 1 + \frac{l \sin(\theta+\phi)}{r_0} \right]^{-2}$$

$$\simeq M_1 g_0 \left[ 1 + \frac{2l \sin(\theta+\phi)}{r_0} \right]^{-1}$$

$$\simeq M_1 g_0 \left[ \frac{1}{1 + \frac{2l \sin(\theta+\phi)}{r_0}} \cdot \frac{1 - 2l \sin(\theta+\phi)}{r_0} \right]$$

$$\simeq M_1 g_0 \left[ 1 - \frac{2l \sin(\theta+\phi)}{r_0} \right]$$

Likewise:

$$F_2 \simeq M_2 g_0 \left[ 1 + \frac{2l \sin(\theta+\phi)}{r_0} \right] \qquad (2)$$

$$F_3 \simeq M_3 g_0 \left[ 1 - \frac{2\lambda \sin(\theta+\phi+\rho)}{r_0} \right]$$

These forces produce torques (measured positive counter-clockwise) of:

$$T_1 = F_1 l \cos(\theta+\phi) \simeq -M_1 g_0 l \cos(\theta+\phi) \left[ 1 - \frac{2l}{r_0} \sin(\theta+\phi) \right]$$

$$T_2 = F_2 l \cos(\theta+\phi) \simeq M_2 g_0 l \cos(\theta+\phi) \left[ 1 + \frac{2l}{r_0} \sin(\theta+\phi) \right].$$

(3)

$$T_3 = -F_3 \lambda \cos(\theta+\phi+\rho)$$

$$\simeq -M_3 g_0 \lambda \cos(\theta+\phi+\rho) \left[ 1 - \frac{2\lambda}{r_0} \sin(\theta+\phi+\rho) \right]$$

The net positive torques then is the sum:

$$T = T_1 + T_2 + T_3$$

or $$T = (M_2 - M_1) g_0 l \cos(\theta+\phi)$$

$$+ 2(M_2 + M_1) \frac{g_0 l^2}{r_0} \sin(\theta+\phi) \cos(\theta+\phi)$$

$$- M_3 g_0 \lambda \cos(\theta+\phi+\rho) + 2$$

$$\frac{M_3 g_0 \lambda^2}{r_0} \sin(\theta+\phi+\rho) \cos(\theta+\phi+\rho)$$

(4)

Now $M_1 = M_2 = M$, so we have $$T = \frac{2M g_0 l^2}{r_0} \sin 2(\theta+\phi) - M_3 g_0 \lambda \cos(\theta+\phi+\rho)$$

$$+ \frac{M_3 g_0 \lambda^2}{r_0} \sin 2(\theta+\phi+\rho)$$

(5)

Of course, if we have perfect balance so that $M_3=0$, Equation 5 reduces to:

$$T = \frac{2M g_0 l^2}{r_0} \sin 2(\theta+\phi) \qquad (6)$$

The system of FIGURE 2 has four angular positions of equilibrium at which the net positive torque T is zero. These occur when the angle:

$$(\theta+\phi) = 0, \pi/2, \pi \text{ or } \frac{3\pi}{2} \qquad (7)$$

The arm A can be expected to come to rest at any one of these four angular positions. Of these four angular positions it can be shown that two are stable and two are unstable. The stable angular positions are those pointing the arm A in the direction of the vector of local gravity in the plane of the system. It would be expected, therefore, that a suitable gravity sensing instrument could be devised by relying on the static angular positions of torque equilibria in the system. However, the static approach is not suitable for the following reasons:

The equation of motion of the system is:

$$\ddot{\theta} = \frac{T}{I}$$

where:
$\ddot{\theta}$=angular acceleration
$I$=rotary moment of inertia $$= \frac{2M g_0 l^2}{I r_0} \sin 2(\theta+\phi) - \frac{M_3 g_0 \lambda}{I} \cos(\theta+\phi+\rho)$$

$$+ \frac{M_3 g_0 \lambda^2}{I r_0} \sin 2(\theta+\phi+\rho)$$

(8)

Let us now look at the oscillation of the system about a stable equilibrium position. For this purpose, let:

$$(\theta+\phi) = \pi/2 + \delta \qquad (9)$$

where $\delta$ is the angular displacement of the arm A from the equilibrium position.

The equation of motion (8) then becomes:

$$\ddot{\theta} = \ddot{\delta} = \frac{2Mg_0l^2}{Ir_0}\sin(\pi+2\delta) - \frac{M_3g_0\lambda}{I}\cos\left(\frac{\pi}{2}+\delta+\rho\right)$$
$$+ \frac{M_3g_0\lambda^2}{Ir_0}\sin(\pi+2\delta+2\rho)$$
(10)

and, for small oscillations about the equilibrium position, $|\delta|<<$, and Equation 10 becomes:

$$\ddot{\delta} = \frac{-4Mg_0l^2\delta}{Ir_0} + \frac{M_3g_0\lambda\delta}{I} + \frac{M_3g_0\lambda\rho}{I} - \frac{2M_3g_0\lambda^2}{Ir_0}(\delta+\rho)$$
(11)

From Equation 11 it is apparent that the gravity term $$\frac{-4Mg_0l^2}{Ir_0}$$

is indistinguishable from the mass unbalance term $$\frac{M_3g_0\lambda\delta}{I}$$

in its dependence on $\delta$. The gravity term would also be indistinguishable from the effects of acceleration of the vehicle on mass unbalance, and since such acceleration could be in any direction, the zero position about which the arm oscillates in the presence of acceleration now fails to provide a unique direction, when there is a mass unbalance in the system (which must exist in any practical system).

The present invention provides, therefore, a dynamic system in which the arm A and the masses $M_1$ and $M_2$, as well as the unbalance mass $M_3$ are rotated about the pivot point P. This rotation causes the gravity term to be dependent on the angle $2\theta$, and the mass unbalance term to be dependent upon the angle $\theta$, as expressed in the equation of motion (8). Now, if the arm A is rotated at some basic rate $W_c$, such that $\theta = (W_ct+\delta)$ we can use Equation 8 to find the equation of motion:

$$\ddot{\theta} = \ddot{\delta} = \frac{2Mg_0l^2}{Ir_0}\sin 2(W_ct+\delta+\phi)$$
$$- \frac{M_3g_0\lambda}{I}\cos(W_ct+\delta+\phi+\rho)$$
$$+ \frac{M_3g_0\lambda^2}{Ir_0}\sin 2(W_ct+\delta+\phi+\rho)$$
(12)

Again for $|\delta|<<$ we find $$\ddot{\delta} = \frac{2Mg_0l^2}{Ir_0}\sin 2(W_ct+\phi) - \frac{M_3g_0\lambda}{I}\cos(W_ct+\phi+\rho)$$
$$+ \frac{M_3g_0\lambda^2}{Ir_0}\sin 2(W_ct+\phi+\rho)$$
(13)

The last term on the right is negligible compared with the other two terms since $\lambda/r_0<<1$. Thus, the effect of a mass unbalance is distinguishable from the effect of gravity because these effects are at two different frequencies.

The above equations presume, however, that the system itself is not being accelerated due to accelerations of the vehicle. The following theoretical discussion is directed to the influence of such accelerations of the vehicle on the system of FIGURE 2. Let the pivot point P move with an arbitrary motion $X(t)$, $Y(t)$ and let the angle $\theta(t)$ also be an arbitrary time function. The X-axis is taken along the reference line $\theta=0$. Then the positions of P, $M_1$, $M_2$ and $M_3$ may be expressed as follows:

$$\vec{P} = \vec{i}x(t) + \vec{j}y(t)$$
$$\vec{P_1} = \vec{i}[x(t)+l\cos\theta(t)] + \vec{j}[y(t)+l\sin\theta(t)]$$
$$\vec{P_2} = \vec{i}[x(t)-l\cos\theta(t)] + \vec{j}[y(t)-l\sin\theta(t)]$$
$$\vec{P_3} = \vec{i}[x(t)+\lambda\cos(\theta+\rho)] + \vec{j}[y(t)+\lambda\sin(\theta+\rho)]$$
(14)

By direct differentiation we can obtain the values $$\ddot{\vec{P}}, \ddot{\vec{P_1}}, \ddot{\vec{P_2}}, \text{ and } \ddot{\vec{P_3}}$$

An acceleration $$\ddot{\vec{P_1}}$$

of the mass $M_1$ results in a torque about the pivot point P of $$\vec{T_1} = M_1(-\ddot{\vec{P_1}})\times(\vec{P_1}-\vec{P}) \quad (15A)$$

Similarly, accelerations of $$\ddot{\vec{P_2}} \text{ and } \ddot{\vec{P_3}}$$

on the mass $M_2$ and $M_3$ produce respective torques about the pivot point P of $$\vec{T_2} = M_2(-\ddot{\vec{P_2}})\times(\vec{P_2}-\vec{P}) \quad (15B)$$
$$\vec{T_3} = M_3(-\ddot{\vec{P_3}})\times(\vec{P_3}-\vec{P}) \quad (15C)$$

Finally, the torque due to gravity derived previously in Equation 8 is $$\vec{T_g} = \vec{K}\frac{2Mg_0l^2}{r_0}\sin 2(\theta+\phi) - M_3g_0\cos(\theta+\phi+\rho)$$
$$+ \frac{M_3g_0\lambda^2}{r_0}\sin 2(\theta+\phi+\rho)$$
(16)

The equation of motion is given by $$\Sigma \text{ torques} = 0 \quad (17)$$

or $$-[2l^2M+\lambda^2M_3]\ddot{\theta} + \lambda M_3[(\ddot{x}+g_0\sin\phi)(\sin\theta+\rho)$$
$$-(\ddot{y}+g_0\cos\phi)(\cos\theta+\rho)] + \frac{2Mg_0l^2}{r_0}\sin 2(\theta+\phi)$$
$$+ \frac{M_3g_0\lambda^2}{r_0}\sin 2(\theta+\phi+\rho) = 0$$
(18)

Then, solving for $\ddot{\theta}$ and letting $I=2l^2M+\lambda^2M_3$ we get:

$$\ddot{\theta} = \frac{\lambda M_3}{I}[(\ddot{x}+g_0\sin\phi)\sin(\theta+\rho)-(\ddot{y}+g_0\cos\phi)\cos(\theta+\rho)]$$
$$+ \frac{2Mg_0l^2}{Ir_0}\sin 2(\theta+\phi) + \frac{M_3g_0\lambda^2}{Ir_0}\sin 2(\theta+\phi+\rho)$$
(19)

To Equation 19 we must, of course, add any bearing friction terms; and since we must drive the device, we must also add a spring term. With a constant speed drive, $\theta=W_ct+\delta$ and $$\dot{\theta} = W_c+\dot{\delta}, \ddot{\theta}=\ddot{\delta}$$

The equation of motion now becomes:

$$\ddot{\delta} + 2c(W_c+\dot{\delta}) + w_0^2\delta = \frac{2Mg_0l^2}{Ir_0}\sin 2(W_ct+\phi)$$
$$+ \frac{\lambda M_3}{I}[(\ddot{x}+g_0\sin\phi)\sin(W_ct+\rho)$$
$$-(\ddot{y}+g_0\cos\phi)\cos(W_ct+\rho)]$$
(20)

where:

2c is the damping friction constant,
$W_0$ is the natural spring frequency.

The term $$\frac{\lambda^2}{r_0}$$

has been dropped from Equation 20 because it is negligible. The damping term $2c(W_c+\theta)$ introduces a phase shift in the response of the system with respect to the excitation. The damping effect of the system can be accurately determined, and this phase shift can be calculated and subtracted out of the measured response.

We see that the mass unbalanced term $$\frac{\lambda M_3}{I}([\ddot{x}+g_0 \sin \phi) \sin (W_c t+\rho)$$
$$-(\ddot{y}+g_0 \cos\phi) \cos (W_c t+\rho)]$$

in Equation 20 has sinusoidal terms of the frequency $W_c$; while the gravity term $$\frac{2Mg_0 l^2}{Ir_0} \sin 2(W_c t+\phi)$$

has sinusoidal terms of the frequency $2W_c$. Therefore, the gravity term in principle, may be separated by filtration from the mass unbalance term, so long as the mass unbalance term does not contain a $2W_c$ frequency component. However, it may be shown that if the terms $\ddot{x}(t)$ and $\ddot{y}(t)$ have components of frequency $W_c$ or $3W_c$, the mass unbalance term will have a frequency component at $2W_c$ If we expand the mass unbalance term in Equation 2 we get:

$$\frac{\lambda M_3}{I}[(\ddot{x}+g_0 \sin \phi) \sin (W_c t+\rho)$$
$$-(\ddot{y}+g_0 \cos \phi) \cos (W_c t+\rho)]$$
$$=\left(\frac{\lambda M_3}{I} \cos \rho\right)[(\ddot{x}+g_0 \sin \phi) \sin W_c t$$
$$-(\ddot{y}+g_0 \cos \phi) \cos W_c t]$$
$$+\frac{\lambda M_3}{I} \sin \rho[(\ddot{x}+g_0 \sin \phi) \cos W_c t$$
$$+(\ddot{y}+g_0 \cos \phi) \sin W_c t$$
(21)

The values $$\frac{\lambda M_3}{I} \text{ and } \rho$$

are unknown. However, the outputs of the accelerometers of the stable platform of the vehicle furnish the signals representative of the combined value of inertial plus gravitational accelerations. Therefore, if the signal from the instrument representative of Equation 20 is passed through a first filter to separate out the $2W_c$ frequency components, the resulting signal will contain the gravitational term and a component of the mass unbalance term if $\ddot{x}(t)$ or $\ddot{y}(t)$ contain frequencies at $W_c$ or $3W_c$ Now, if the signal from the accelerometer is passed through a second filter to remove its $2W_c$ frequency component, the latter component can be subtracted from the signal from the first filter to derive a signal representative of the gravitational term alone.

It follows, therefore, that when the masses $M_1$, $M_2$ and $M_3$ are rotated about the first point P, the acceleration of these masses due to the vector of local gravity in the plane of the system is in accordance with the term $$\frac{2Mg_0 l^2}{Ir_0} \sin 2(W_c t+\phi)$$

and that a signal representative of that term alone may be derived in the manner explained above. This signal has twice the frequency of rotation of the masses, as explained. The phase displacement of this signal from a reference is then an indication of the direction of the gravity vector in the plane of the system. It should be pointed out that the amplitude of the signal is a measure of the distance vector of the vehicle in the plane of the system from the source of gravity.

From the knowledge of the direction of gravity in two orthogonal planes, the direction of gravity itself in three-dimensional space may then be found:

$$\vec{g}=A_1\vec{i}_1+A_2\vec{i}_2+A_3\vec{i}_3=A_3\left(\frac{A_1}{A_3}\vec{i}_1+\frac{A_2}{A_3}\vec{i}_2+\vec{i}_3\right) \quad (22)$$

In this equation $A_1$, $A_2$ and $A_3$ are the magnitudes of orthogonal vectors, one of which is vertical; and $i_1$, $i_2$ and $i_3$ are unity vectors in three orthogonal directions, one of which is vertical. Now $A1/A2$, $A2/A3$ determine the direction of $\vec{g}$ in the $X_1X_3$-plane and in the $X_2X_3$-plane, respectively. Hence, given these quantities, the vector in parenthesis in Equation 22 is completely known. However, $\vec{g}$ lies along this vector, and hence the direction of gravity may be determined.

When the vehicle is at a large distance from any celestial body the gravitational force of the vehicle itself can become an important vector. That is, the direction of the gravity vector can be strongly influenced by the mass of the vehicle itself. It should be noted, however, that insofar as the mass distribution of the vehicle is known, the effect of that mass can be computed and can be taken into account. For a large vehicle, the gravity force due to the mass of the vehicle is of the order, for example of 1/800 of the gravity force due to the earth when the vehicle is near the earth's surface.

The constructional details of one possible mechanism for carrying out the concepts of the invention will now be considered. It is obvious that a reference must be obtained for the measurement of $\delta$. It is also apparent that measuring the continuously rotating arm A against any reference fixed in the platform would result in the desired measurement being a very small difference of very large numbers. It is also obvious that such a measurement would entail great difficulties in obtaining the necessary high linearity over the range. It is, therefore, proposed to use a rotating reference, the reference number rotating at the speed $W_c t$. As noted above, FIGURES 3, 4 and 5 are representative of one particular mechanical construction which may be used in carrying out the concepts of the invention. As shown in FIGURE 3, a sensor unit 10 depicted therein is one of two similar sensor units 10 and 20 (FIGURE 7) which are respectively mounted in orthogonally related planes, for the reasons discussed above. The sensor units 10 and 20 are mounted on usual inertial platforms which may be stabilized by any known gyroscopic means, not shown. The two platforms, being stabilized, maintain their particular originally set orientations except for any incidental drifts due to the drifts of the stabilizing gyroscopic means.

The sensor units 10 and 20 respond to the gravity vectors in the two orthogonal planes, with each vector representing both the direction of local gravity and distance to the source thereof. With the gravity direction information being given in two perpendicular planes, the direction and distance of the vehicle in three dimensional space from the gravity source may readily be determined.

From Equation 23 it was shown that the direction of local gravity is given by the term $$A_3\left(\frac{A_1}{A_3}\vec{i}_1+\frac{A_2}{A_3}\vec{i}_2+\vec{i}_3\right)$$

As noted above, the terms $A_1/A_3$ and $A_2/A_3$ determine the direction of the vectors of local gravity in the two orthogonal planes, and together define a plane from which the direction of local gravity may be determined. Therefore, given these quantities, the direction of local gravity may be determined. The determined direction of local gravity is the direction from the vehicle to the center of the local gravity source.

The sensor 10, for example, includes a continuously rotatable cylindrically shaped sensor member 11 which determines the gravity vector in its particular plane. The sensor member 11 has two spaced-apart identical masses such as a pair of cylindrical weights 12 and 13. The operating principles discussed above in conjunction with FIGURES 1 and 2 are the basic principles utilized in the operation of the sensor unit 10 and the sensor unit 20 to develop gravity vectors.

As shown, for example, in FIGURES 3–5, the cylindrically shaped sensor member 11 is mounted coaxially within a cylindrically rotatable housing 22, the housing 22 is rotated through a coupling by an eddy current disk 17. The disk 17 is rotated by an electro-magnet 19, and the electro-magnet is energized from an alternating current source 30 (FIGURE 5) through a rheostat 31. The source 30 may, for example, be a 400 cycle 100 volt source. The speed of the disk 17, and therefore the speed of the housing 22, is determined by adjustment of the rheostat 31.

The speed of rotation of the disk 17 may be relatively low, for example, as low as two revolutions per minute, or as high as sixty revolutions per minute. A relatively slow speed is utilized because the housing 22 is preferably supported, by bearings which exhibit extremely low friction. It is to be understood, of course, that other suspension means, such as air bearings, or the like, may be used.

As shown particularly in FIGURE 4, the eddy current disk 17 is mounted on a bushing 17a which is rotatably supported in a bearing 33. The bushing 17a rotates with the disk 17. The bearing 33, which rotatably supports the bushing 17a, is supported by a base 21 having a U-shaped cross section. The base 21 supports the bearing 33 at one side of the sensor member 11, and it supports a similar bearing 34 at the other side of the sensor member.

The disk 17 is rigidly attached to the sensor housing 22 so that the sensor housing 22 rotates together with the eddy current disk 17. The housing 22 serves as a rotating reference member for the sensor 11. The bushing 17a may actually be an integral part of the sensor housing 22. The sensor housing 22 is cylindrically shaped and fully encloses the cylindrically shaped sensor 11. When the electro-magnet 19 is energized, it accelerates the eddy current disk 17 and the sensor housing 22 up to operating speed. As the sensor housing 22 accelerates, it drives the sensor member 11 to operating speed being coupled thereto by a pin 36. The pin 36 is mounted on the sensor housing 22 and fits a depression 37 in the sensor member 11. The depression 37 may be cylindrically shaped having a substantially larger diameter than that of the pin 36. As is hereinafter described, after the housing 22 and the sensor member 11 come up to operating speed, the pin 36 does not contact the sides of the depression 37.

The sensor member 11, which is partially hollow, may be made, for example, of beryllium or quartz, and the two heavy masses 12 and 13 supported in the sensor member may be cylindrically shaped. The masses may, for example, be made of gold, iridium, osmium, platinum or tungsten.

The sensor member 11 is fixedly mounted on and is supported by a shaft 26. The shaft, in turn, is supported on two suitable bearings 40 and 41. The bearings 40 and 41, which are mounted on the sensor housing 22, initially support and maintain the sensor member 11 in position. These bearings provide, however, for a small clearance of, for example, approximately .0002 inch between the ends of the shaft 26 and the internal surfaces of the bearings 40 and 41. The shaft 26 may be press-fitted into the sensor member 11 to form effectively an integral part thereof.

The sensor member 11 is restrained laterally by thrust bearings 42 and 43 which are mounted respectively on the end of threaded shafts 44t and 45t and which bear against the ends of the shaft 26, as shown. The shafts 44t and 45t are laterally adjustable in two internally threaded sleeves 44 and 45, respectively. The sleeves 44 and 45 are supported by and rotated with two hubs 17a and 17b. The hub 17a, as described above, supports the eddy current disk 17 and one end of the sensor housing 22 and the hub 17b supports the other end of the sensor housing 22. The hubs 17a and 17b rotate within the bearings 33 and 34.

The sleeves 44 and 45 each support six slip rings 44a and 45a, respectively, which are part of communication paths to two microsyns 50 and 51. Microsyns, such as the microsyns 50 and 51 are well known in the art, and such devices are illustrated in the Control Engineer's Handbook prepared by Truxsal (1958) and published by the McGraw Hill Company.

The microsyn 50 is utilized as a torquing and centering device with a control signal being introduced to its secondary winding and an energizing signal being introduced to its primary windings to rotate its rotor with respect to its stator poles. The microsyn 51, on the other hand, is utilized as a sensing means to generate at its secondary windings a signal corresponding to the angular position of the rotor of the microsyn 50. As indicated in FIGURE 7, an energizing signal is provided to the primary windings of the microsyn 51 as well as to the primary windings of the microsyn 50. The rotors of the microsyns 50 and 51 are fixedly supported on the opposite ends of the shaft 26 and rotate with that shaft. The stators of the two microsyns 50 and 51 are supported in the sensor housing 22 at opposite sides of the sensor member 11.

In addition to the sensing and torquing functions of the microsyns 50 and 51, they also function to center their respective rotors between the corresponding stators, and during rotation they serve as bearings. Any displacement from center develops a flux which is directly proportional to the displacement and which acts in a direction to re-center the rotors. During the operation of the sensor unit 10, the ends of the shaft 26 are, therefore, effectively supported by the two microsyns 50 and 51 and the rotors, therefore, do not contact the bearings 40 and 41 during normal operation of the instrument.

The gap between the rotor and stator of each of the microsyns 50 and 51 may be approximately 0.003 inch. This is more than ten times the clearance between the ends of the shaft 26 and the bearings 40 and 41. The rotors, therefore, do not contact the stator poles even when the windings of the microsyns are not energized. When the microsyn windings are energized, the microsyns 50 and 51 function to provide, for example, a suspension for the sensor member 11 in the sensor housing 22 which, for all practical purposes, is essentially frictionless.

Referring again to FIGURE 7, the microsyn primary windings are energized, for example, by a 1000 cycle per second source 76 of 26 volts. The alternating current energizing signals from that source are introduced through capacitors 53–56 to four of the brushes 72 and to four of the brushes 71, respectively associated with the slip rings 44a and 45a, on the shafts 44 and 45. As indicated above, there are six brushes 71 for the microsyn torquer 51 and six brushes 72 for the microsyn sensor 50. The microsyn sensor 51 develops a signal at its secondary windings which indicates the angular displacement of its stator with respect to its rotor. The stator of the microsyn 51 is rotating at the rotating frequency of the eddy current disk 17 and of the reference member sensor housing 22. The instantaneous phase of the signal developed by microsyn sensor 51 with respect to a particular reference signal depends upon the accelerations of the sensor 11 due to the gravity vector and to the mass unbalance.

The signal developed by the microsyn sensor 51 is introduced through two of the brushes 71 to an electronic control system 57. The control system 57 contains appropriate amplifiers, such as the amplifier 200 (FIGURE 8); filters, such as the filter 202, demodulators, such as the phase detector 204 and other known types of electronic networks to perform the necessary operations on the signal as indicated by the mathematical analyses above. The design of appropriate networks for the control system 57 is well within the understanding of the skilled person in this particular art, and for that reason these networks will not be explained in detail herein. The control system 57 also contains a closed loop servo system 212 for introducing a driving signal to the microsyn torquer 50 through two of its brushes 72. In this manner, the speed of the rotors of the microsyns 50 and 51 is regulated by a closed loop servo system to correspond to the speed of the stators of the microsyns.

As described in detail herein, the signal generated by the microsyn sensor 51 has two components, one determined by the local gravity vector in the plane of the system, and the other by the mass unbalance of the sensor 11 about its axis of rotation. As also described, the frequency of the gravity component is twice that of the mass unbalance component. The electronic control system 57 includes appropriate electrical filter networks such as the filter 202 for separating these components and for supplying the former to the computer 100 and to the phase detector 204. The phase detector 204 compares the phase of the signal from the filter 202 with a reference signal from a signal generator 210. The resulting signal, which indicates phase displacements of the signal from the filter 202 with respect to the reference signal from the generator 210, is applied to the computer 100.

A timing ring 73, as shown in FIGURE 6, is used for supplying timing pulses to a timing pulse generator 206 in the control system 57 for reference purposes in the computer 100. This timing ring produces a pulse for each revolution of the eddy current disk 17. The timing ring 73 has a single mirror 73a which reflects light from a light source 88 once during each revolution of the disk 17, the light being so reflected to a photocell 90. The timing pulses are provided, therefore by the generator 206, at a repetition rate of one pulse per revolution of the housing 10. The timing ring 73 is one of two timing rings 73 and 74, which are concentrically mounted on the eddy current disk 17. The pulses from the timing ring 73 are utilized by the computer to determine the phase variations of the signals.

The timing ring 74 also supplies pulses to a timing pulse generator 208 to the control system 57. The timing ring 74, as shown in FIGURE 6, is mounted on the eddy current disk 17 together with the timing ring 73. The timing ring 74 has a number of mirrors 74a spaced about its outer surface. The source of light 88 directing light to the successive mirrors 74a on the ring 74, so that if the ring 74 rotates with the eddy current disk 17, the light is periodically reflected from the mirrors 74a to a photocell 89. The output from the photocell, is therefore a series of pulses occurring at a repetition rate determined by the frequency of rotation of the disk 17. The pulses developed by the timing ring 74 are utilized to trigger the timing pulse generator 208 in the control system 57 to produce pulses for the computer 100 at a repetition rate corresponding to the frequency of the signals from the microsyn sensor 51 for reference purposes.

The computer 100 serves to combine the signals from the units 10 and 20 to derive the actual direction of local gravity, and thereby obtain an indication of the direction from the vehicle to the center of the source of local gravity. Also, the amplitudes of the signals are used in the computer to determine the range of the vehicle from the source of local gravity.

The computer utilizes the signals, therefore, to provide an indication of the range of the space vehicle from the center of the local celestial body, and also to provide an indication of the direction of the vehicle from the center of the local celestial body.

It should again be stated that the particular equipment illustrated in FIGURES 4–8, and described above, is representative of merely one particular suggested means for carrying out the concepts and principles of the present invention. It is evident that the principles involved are susceptible of being carried out by other mechanical and electrical mechanisms and systems.

The system described above, therefore, is capable of determining the vertical vector between a vehicle in space and a local celestial body. Moreover, the system provides this indication without recourse to external aids or memory devices.

As described, two systems embodying the concepts of the invention and mounted in perpendicular planes will serve, not only to define the direction of gravity, but also to obtain a measure of $g/r$. This, in combination with a knowledge of the mass of the attracting celestial body, will provide a measurement of the distance of the vehicle from the center of the attracting body. Therefore, not only is the direction of the vertical provided, but a base line for measurements.

The system of the invention is particularly applicable to an orbiting vehicle. In such a case, a free fall condition exists and the vehicle accelerations equal the gravity terms, so that the term due to acceleration of mass unbalance ($M_3$) disappears. This allows the determination of the vertical to be made without requiring a correlation analysis to determine the mass unbalance.

I claim:

1. An instrument for determining the direction of a vector of the force of gravity from a gravity source, including: a rotatable sensor member having at least two spaced-apart masses; reference means for providing a reference for said sensor member corresponding to a particular speed of rotation of said sensor member; means for causing said sensor member to rotate at said particular speed of rotation; timing means for producing a timing signal indicative of the angular positions of said sensor member; sensing means coupled to said sensor member and to said reference means for sensing deviations in the speed of rotation of said sensor member from said particular speed and for developing a cyclic signal in response to such deviations, said cyclic signal having a first frequency component due to gravity effects on said sensor member and a second frequency component due to mass unbalance of said sensor member, said second frequency component having a frequency different from said first frequency component; circuit means coupled to said sensing means for separating out said first frequency component of said cyclic signal and for producing an output signal corresponding thereto; and means coupled to said circuit means and to said timing means and utilizing said output signal and said timing signal to provide an indication of the direction of the aforesaid gravity vector.

2. The instrument defined in claim 1 in which said first frequency component of said cyclic signal has a frequency corresponding to twice said particular speed of rotation, and said second frequency component has a frequency corresponding to said particular speed of rotation.

3. An instrument for determining the direction of a vector of the force of gravity from a gravity source, including: a rotatable sensor member having two diametrically positioned spaced-apart masses; a rotatable reference member for providing a reference for said sensor member corresponding to a particular speed of rotation of said sensor member; means coupled to said reference member and to said reference member for causing said reference member and said sensor member to rotate at said particular speed; timing means coupled to said reference member for providing a timing signal for said sensor member representative of the angular positions thereof; sensing means coupled to said sensor member and to said reference member for sensing deviations in the speed of rotation of said sensor member from said particular speed and for developing a cyclic signal in response to such deviations, said cyclic signal having a first frequency component having a frequency corresponding to twice said particular speed and caused by gravity effects on said sensor member, and said cyclic signal having a second frequency component having a frequency corresponding to said particular speed and caused by mass unbalance of said sensor member; circuit means coupled to said sensing means for separating out said first frequency component of said cyclic signal and for producing an output signal corresponding thereto; and means coupled to said circuit means and to said timing means for utilizing said output signal and said timing signal to provide an indication of the direction of said gravity vector.

4. An instrument for determining the direction of a vector of the force of gravity from a gravity source, including: a base member; a sensor member rotatably mounted on said base member and having two diametrically positioned spaced-apart equal masses; a reference member rotatably mounted on said base member in coaxial relationship with said sensor member and forming a housing therefor; electrically actuated drive means coupled to said reference member for causing said reference member to rotate at a particular reference speed; means coupling said reference member to said sensor member for causing said sensor member to rotate at said particular speed; timing means coupled to said reference member for providing a timing signal related to the rotation of said reference member and said sensor member; sensing means coupled to said sensor member and to said reference member for sensing rotational speed deviations of said sensor member from said sensor member from said particular speed in successive rotations of said sensor member and for developing a cyclic signal in response to such deviations, said cyclic signal having a first frequency component corresponding to twice said particular speed of rotation and caused by gravity affects on the masses of said sensor member and a second frequency component having a frequency corresponding to said particular speed of rotation and caused by mass unbalance of said sensor member; circuit means coupled to said sensing means for separating out said first frequency component of said cyclic signal and for producing an output signal corresponding thereto; and means coupled to said circuit means and to said timing means for utilizing said output signal and said timing signal to provide an indication of the direction of said gravity vector.

5. The instrument defined in claim 4 in which said drive means applies a predetermined uniform torque to said reference member, and in which said means coupling said reference member and said sensor member includes electro-magnetic means for imparting the predetermined torque to said sensor member.

6. The instrument defined in claim 4 in which said means coupling said reference member to said sensor member includes a torquing device coupled to said sensor member for applying a uniform torque to said sensor member so that the instantaneous speed of rotation of said sensor member depends both upon the operation of said torquing device and the effects of extraneous forces on said sensor member.

7. An instrument for determining the direction of the force of gravity from a gravity source, said instrument including at least two sensor units for developing signals representing gravity vectors together indicating the direction of the gravity source, each of said sensor units including: a rotatable sensor member having two diametrically positioned spaced-apart masses; a rotatable reference member for providing a reference for said sensor member corresponding to a particular speed of rotation of said sensor member; drive means coupled to said reference member and to said sensor member for causing said reference member and said sensor member to rotate at said particular speed; timing means coupled to said reference member for providing a timing signal indicative of the rotation of said sensor member; sensing means coupled to said sensor member and to said reference means for sensing rotational speed deviations of said sensor member from said particular speed and for developing a cyclic signal in response to such angular displacements, said last-named signal having a first frequency component having a frequency corresponding to twice the said particular speed of rotation and caused by gravity effects on said sensor member and having a second frequency component having a frequency corresponding to said particular speed of rotation and caused by mass unbalance of said sensor member; circuit means coupled to said sensing means for separating out said first frequency component of said last-named signal and for producing an output signal corresponding thereto; and means coupled to said circuit means of each of said units and to said timing means thereof and responding to said output and timing signals to provide an indication of the direction of the force of gravity from the gravity source.

8. The combination defined in claim 7 in which said two units are positioned so that the axis of rotation of said two masses in one of said units bears an orthogonal relationship to the axis of rotation of said two masses in the other of said two units.

References Cited in the file of this patent

UNITED STATES PATENTS

| 2,319,940 | Marrison | May 25, 1943 |
| 2,991,659 | Bowden | Mar. 16, 1959 |